(12) United States Patent    (10) Patent No.:    US 9,312,601 B2
Kubo et al.                  (45) Date of Patent:   Apr. 12, 2016

(54) ANTENNA DEVICE AND COMMUNICATION TERMINAL DEVICE

(71) Applicant: MURATA MANUFACTURING CO., LTD., Kyoto-fu (JP)

(72) Inventors: Hiroyuki Kubo, Kyoto-fu (JP); Hiromitsu Ito, Kyoto-fu (JP); Kuniaki Yosui, Kyoto-fu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 374 days.

(21) Appl. No.: 13/765,512

(22) Filed: Feb. 12, 2013

(65) Prior Publication Data

US 2013/0154891 A1    Jun. 20, 2013

Related U.S. Application Data

(63) Continuation of application No. PCT/JP2011/057097, filed on Mar. 24, 2011.

(30) Foreign Application Priority Data

Aug. 12, 2010    (JP) .................................. 2010-180925

(51) Int. Cl.
*H01Q 1/24*    (2006.01)
*H01Q 7/08*    (2006.01)
(Continued)

(52) U.S. Cl.
CPC .............. *H01Q 7/06* (2013.01); *G06K 19/0779* (2013.01); *G06K 19/07779* (2013.01); *H01Q 1/243* (2013.01); *H01Q 7/08* (2013.01)

(58) Field of Classification Search
CPC ........... H01Q 1/243; H01Q 7/06; H01Q 7/08; G06K 19/07779; G06K 19/0779
USPC .................................................... 343/702, 788
See application file for complete search history.

(56) References Cited

U.S. PATENT DOCUMENTS 5,408,243 A  *   4/1995   D'Hont .......................... 343/718
5,567,537 A  *   10/1996  Yoshizawa et al. ........... 428/800
(Continued)

FOREIGN PATENT DOCUMENTS

JP     2001-209767 A    8/2001
JP     2004-166176 A    6/2004
(Continued)

OTHER PUBLICATIONS

International Search Report; PCT/JP2011/057097; Jun. 28, 2011.
(Continued)

*Primary Examiner* — Michael C Wimer
(74) *Attorney, Agent, or Firm* — Studebaker & Brackett PC

(57) ABSTRACT

An antenna device or a communication terminal device including the antenna device includes ground conductor, which serves as a plate-shaped conductor and is provided in an inner layer of a circuit board. An antenna coil is mounted so that a first main surface of a magnetic core faces the circuit board. The antenna coil is arranged so that a first conductor portion of a coil conductor is at a position that is closer to the ground conductor than a second conductor portion. The antenna coil is arranged so that the first conductor portion of the coil conductor is positioned in the vicinity of a longitudinal direction end portion of a casing, and the first conductor portion of the coil conductor is bent in a direction toward the ground conductor.

18 Claims, 14 Drawing Sheets

(51) Int. Cl.
*H01Q 7/06* (2006.01)
*G06K 19/077* (2006.01)

(56) References Cited

U.S. PATENT DOCUMENTS

| | | | |
|---|---|---|---|
| 8,698,685 B2 * | 4/2014 | Ito et al. ........................ | 343/788 |
| 2001/0011012 A1 | 8/2001 | Hino et al. | |
| 2005/0001031 A1 | 1/2005 | Akiho et al. | |
| 2012/0208606 A1 | 8/2012 | Kubo et al. | |

FOREIGN PATENT DOCUMENTS

| | | |
|---|---|---|
| JP | 3975918 B2 | 9/2007 |
| JP | 2008-092131 A | 4/2008 |
| JP | 4978756 B2 | 7/2012 |

OTHER PUBLICATIONS

Written Opinion of the International Searching Authority; PCT/JP2011/057097; Jun. 28, 2011.

* cited by examiner

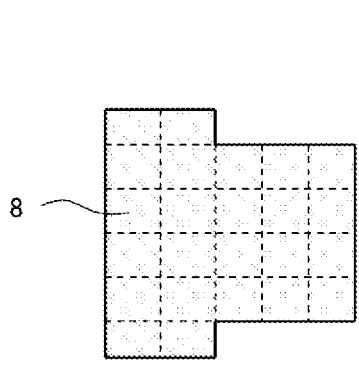
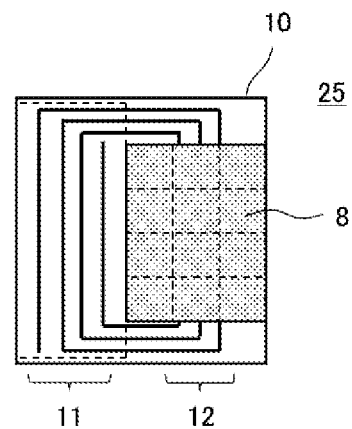
FIG.16A  FIG.16B
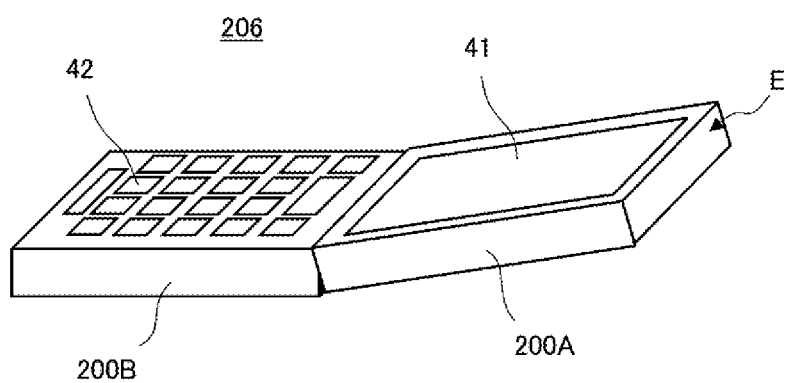
FIG.17A
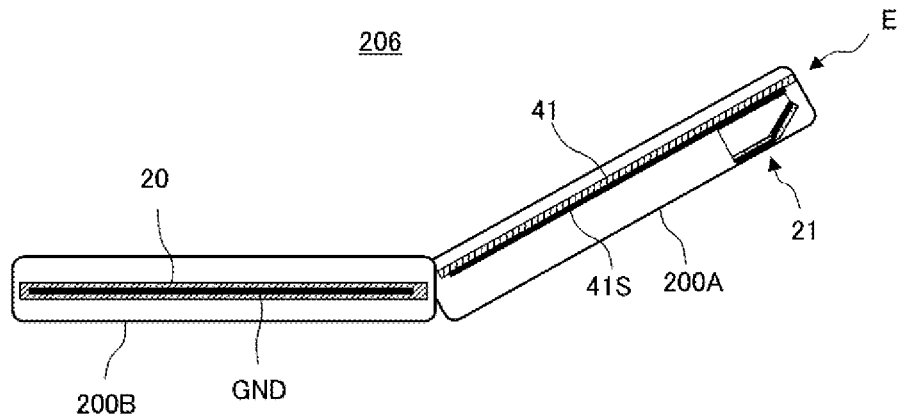
FIG.17B

ANTENNA DEVICE AND COMMUNICATION TERMINAL DEVICE

CROSS REFERENCE TO RELATED APPLICATIONS

The present application is a continuation of International Application No. PCT/2011/057097 filed on Mar. 24, 2011, and claims priority to Japanese Patent Application No. 2010-180925 filed on Aug. 12, 2010, the entire contents of each of these applications being incorporated herein by reference in their entirety.

TECHNICAL FIELD

The technical field relates to antenna devices and communication terminal devices that can be used in for example radio frequency identification (RFID) systems in which communication is performed with external appliances via electromagnetic field signals.

BACKGROUND

In recent years, RFID systems utilizing a HF band of for example 13.56 MHz have been widely used as FeliCa (FeliCa: registered trademark) and near field communication (NFC) systems. For example, an antenna device for an RFID system is disclosed in Japanese Patent No. 3975918 (Patent Document 1).

FIG. 1 is a sectional view of an antenna device section of a communication terminal device 90 described in Patent Document 1. This antenna device includes an asymmetrically shaped coil in which the winding intervals at two positions that face each other across a central portion of the winding region of the coil 71 have been made to be different from each other. At a large winding interval side 71a, a magnetic body 72 is arranged on a surface of the coil 71 opposite to an input-unit-94-side surface, which faces an IC card 1, of the coil 71, and at a small winding interval side 71b, the magnetic body 72 is arranged on the input-unit-94-side surface, which faces the IC card, of the coil 71. A reader/writer circuit 50 is connected to the coil 71. The antenna device is arranged in an antenna housing concavity 97a formed in a metal casing 97 and is protected by a resin member 98. The magnetic field distribution of the antenna device is a distribution whose asymmetricity is more pronounced on the side 71a at which the winding interval and the line width of the coil 71 are larger. Consequently, an excellent communication state can be secured in a direction orthogonal to a main surface of the antenna device.

SUMMARY

The present disclosure provides a communication terminal device that can suppress degradation of communication performance and is capable of communicating with a communication partner over a wide angular range regardless of the positional relationship (particularly, angular relationship) between the communication terminal device and the communication partner.

According to a first aspect of the present disclosure, an antenna device includes an antenna coil including a magnetic core having a first main surface and a second main surface, and a coil conductor wound around the magnetic core, and a planar conductor arranged close to the magnetic core. The coil conductor includes a first conductor portion positioned on a first main surface side of the magnetic core and a second conductor portion positioned on a second main surface side of the magnetic core and arranged at a different position to the first conductor portion when viewed in plan from a direction of the first or second main surface. The antenna coil is arranged so that the first main surface side of the magnetic core is on the planar conductor side and so that the first conductor portion of the coil conductor is close to an end portion of the planar conductor, and the first conductor portion of the coil conductor is bent in a direction toward the planar conductor.

According to a second aspect of the present disclosure, in the antenna device, the planar conductor is a ground electrode that is formed in a circuit board arranged inside a casing and the second conductor portion of the coil conductor is arranged so as to face the planar conductor.

According to a third aspect of the present disclosure, in the antenna device, the magnetic core is a mixture of a magnetic powder and a resin molded into a sheet shape, or is a sintered magnetic body that is made into a plurality of small pieces.

According to a fourth aspect of the present disclosure, in the antenna device, the width of one end of the magnetic core is larger than the width of the remaining portion of the magnetic core.

According to a fifth aspect of the present disclosure, a communication terminal device includes an antenna coil including a magnetic core having a first main surface and a second main surface, and a coil conductor wound around the magnetic core, a planar conductor arranged close to the magnetic core, and a casing that houses the antenna coil and the planar conductor. The coil conductor includes a first conductor portion positioned on the first main surface side of the magnetic core and a second conductor portion positioned on the second main surface side of the magnetic core and arranged at a different position to the first conductor portion when viewed in plan from a direction of the first or second main surface. The antenna coil is arranged so that the first main surface side of the magnetic core is on the planar conductor side and so that the first conductor portion of the coil conductor is close to an end portion of the planar conductor, and the first conductor portion of the coil conductor is bent in a direction toward the planar conductor.

BRIEF DESCRIPTION OF DRAWINGS

FIG. 2A is a plan view of the antenna coil and FIG. 2B is a front view of the same.

FIG. 4A is a plan view of an antenna device 101, FIG. 4B is a front view of the same, and FIG. 4C is an outline sectional view of a communication terminal device.

FIG. 9A is a perspective view of a state in which communication is performed between two communication terminal devices and FIG. 9B is a sectional view of the same.

FIG. 10A is a perspective view of a state in which communication is performed between two communication terminal devices and FIG. 10B is a sectional view of the same.

FIG. 11 illustrate yet another state in which communication is performed between two communication terminal devices, where

FIG. 16A is a plan view of a magnetic core provided in an antenna coil according to a fifth exemplary embodiment and FIG. 16B is a plan view of an antenna coil according to the fifth exemplary embodiment.

FIG. 17A is a perspective view of a communication terminal device according a sixth exemplary embodiment and FIG. 17B is a sectional view of the same.

DETAILED DESCRIPTION

The inventors realized that when a communication terminal device is held next to a communication partner such as a reader/writer, the angle between the antenna of the communication terminal device and the antenna of the communication partner will not necessarily be constant and there is a risk that communication may not be stable or may become impossible depending on the positional relationship (angular relationship) between the communication terminal device and the communication partner. This trend is more pronounced in RFID systems in which communication is performed between two communication terminal devices, than in RFID systems in which communication is performed between a communication terminal device (reader/writer) and an IC card (IC tag).

Figure 1:
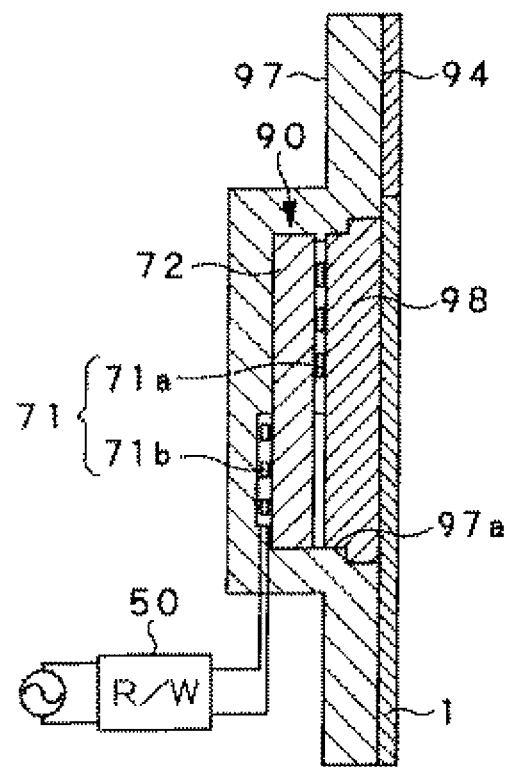
FIG. 1 is a sectional view of an antenna device section of a communication terminal device described in Patent Document 1.

In the communication terminal device of Patent Document 1, as illustrated in FIG. 1, since the antenna device is arranged inside the antenna housing concavity 97a formed in the metal casing 97, an excellent communication state can be secured in a state where magnetic flux is received from a direction orthogonal to a main surface of the antenna device, but when the angle between the antenna of the reader/writer and the antenna of the communication terminal device becomes large, or the distance between the two antennas becomes large, it is difficult to secure satisfactory communication characteristics.

Figure 2A:
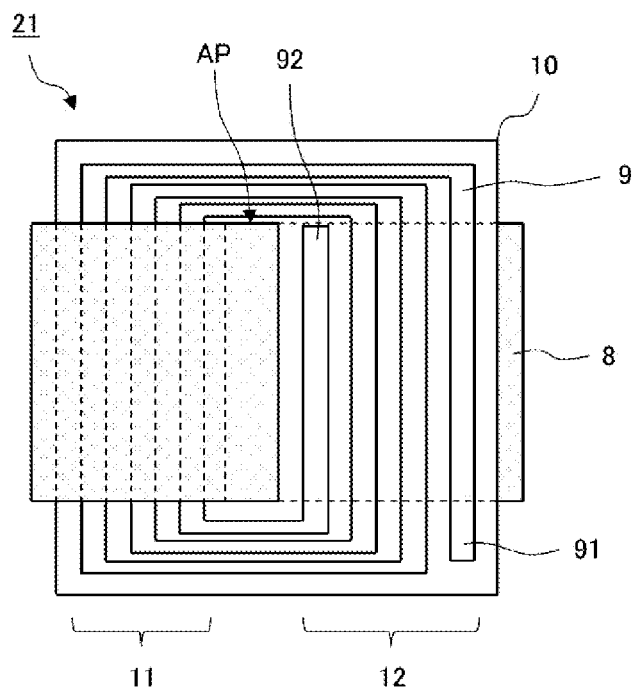
FIGS. 2A and 2b illustrate an antenna coil included in a communication terminal device according to a first exemplary embodiment.
Figure 2B:
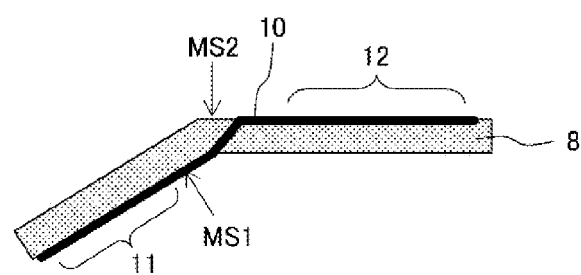

A communication terminal device according to a first exemplary embodiment that can address the above-described shortcomings is used as a mobile communication terminal, such as a cellular phone terminal. FIG. 2 illustrates an antenna coil included in the communication terminal device. This antenna coil 21 is used as an antenna for an RFID system of a HF band such as 13.56 MHz. FIG. 2A is a plan view of the antenna coil and FIG. 2B is a front view of the same. The antenna coil 21 includes a magnetic core 8 having a first main surface MS1 and a second main surface MS2, and a coil conductor 9 that is wound around the magnetic core 8. The coil conductor 9 includes a first conductor portion 11 positioned on a first main surface MS1 side of the magnetic core 8 and a second conductor portion 12 positioned on a second main surface MS2 side of the magnetic core 8 and arranged at a different position to the first conductor portion 11 (non-superposed position) when viewed in plan from a direction of the main surface MS1.

As illustrated in FIG. 2A, the magnetic core 8 is formed by molding a mixture of a ferrite powder and a resin material into a rectangular plate shape. The coil conductor 9 is obtained by pattern forming a metal thin film such as a copper, silver or aluminum thin film, into a rectangular coil shape on a surface of a flexible substrate 10 composed of PET or the like. A terminal electrode 91 is formed by one end of the coil conductor 9 and a terminal electrode 92 is formed by the other end of the coil conductor 9. These terminal electrodes 91 and 92 are connected to a feeder circuit, which is not illustrated.

Figure 3:
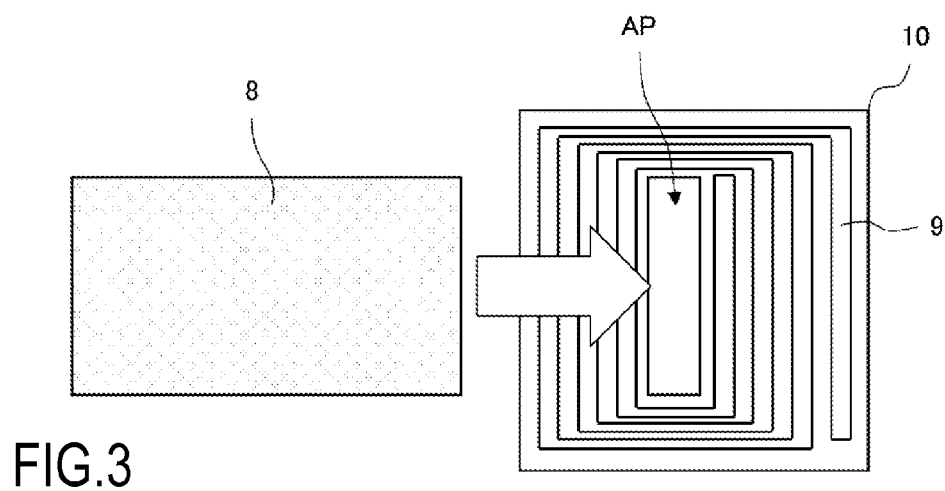
FIG. 3 is a plan view of state in which a flexible substrate, on which the coil conductor is formed, and a magnetic core are separated from each other.

FIG. 3 is a plan view of state in which the flexible substrate 10, on which the coil conductor 9 is formed, and the magnetic core 8 are separated from each other. As illustrated in FIG. 3, a rectangular aperture AP is provided in the flexible substrate 10 at a position corresponding to a winding center portion of the coil conductor 9. The magnetic core 8 is inserted into the aperture AP. Therefore, the coil conductor 9 includes the first conductor portion 11 positioned on the first main surface MS1 side of the magnetic core 8 and the second conductor portion 12 positioned on the second main surface MS2 side of the magnetic core 8. The antenna coil 21 is formed of the magnetic core 8 and the coil conductor 9.

Figure 4A:
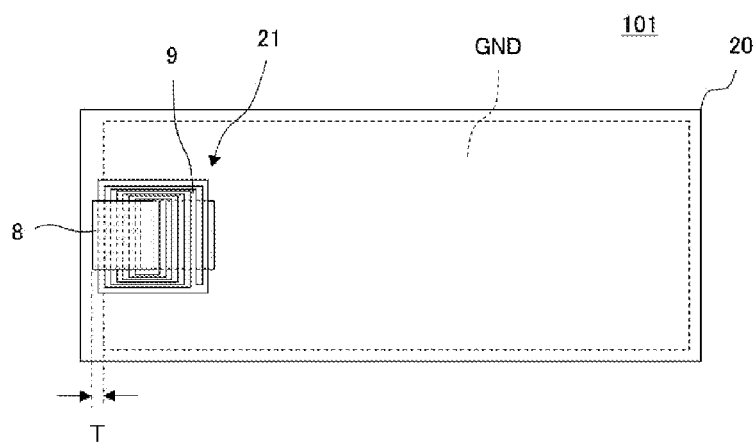
FIGS. 4A-4C illustrate the structures of a communication terminal device and an antenna device included in the communication terminal device according to the first exemplary embodiment.
Figure 4B:
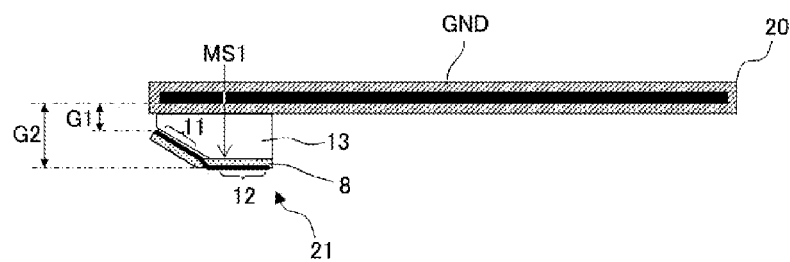
Figure 4C:
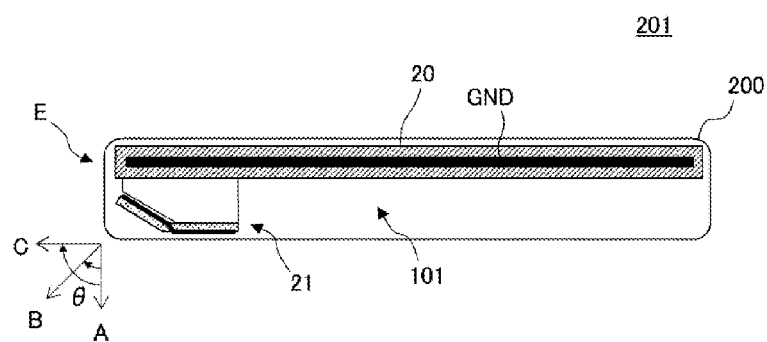

FIG. 4 illustrates the structures of the communication terminal device and the antenna coil included in the communication terminal device according to the first embodiment. FIG. 4A is a bottom view of an antenna device 101 and FIG. 4B is a front view of the same. In addition, FIG. 4C is an outline sectional view of a communication device 201.

As illustrated in FIG. 4A, a circuit board 20 is formed of a thermosetting resin such as an epoxy resin and a ground conductor GND is provided as plate-shaped conductor in an inner layer thereof. Although not illustrated, in addition to the feeder circuit connected to the antenna coil 21, various electronic components for forming a mobile communication terminal are mounted on the front and back surfaces of the circuit board 20.

In addition, as illustrated in FIG. 4B, the antenna coil 21 is mounted on the circuit board 20 with an insulating support 13 therebetween using a bonding material so that the first main surface MS1 of the magnetic core 8 faces the circuit board 20. Therefore, the first main surface MS1 of the magnetic core 8 faces the ground conductor GND. That is, the antenna coil 21 is arranged so as to be superposed with the ground conductor GND when viewed in plan from a direction of the first main surface MS1 or the second main surface MS2 of the magnetic core 8. The coil conductor 9 and the ground conductor GND are arranged so as to be separated by gaps G1 to G2. In this way, communication characteristics at a magnetic flux azimuth angle θ of 0°, which will be described below, are improved by forming the gap between the coil conductor 9 and the ground conductor GND using the support 13.

In addition, the antenna coil 21 is arranged so that the first conductor portion 11 of the coil conductor 9 is at a position that is closer to the ground conductor GND than the second conductor portion 12.

In addition, the antenna coil 21 is arranged so that the first conductor portion 11 of the coil conductor 9 is positioned in the vicinity of a longitudinal-direction end portion E of a casing 200. The longitudinal-direction end portion of the casing 200 is a portion that becomes a top end portion when the communication terminal device is held vertically.

In addition, the magnetic core 8 of the antenna coil 21 is structured and arranged such that an end portion of the magnetic core 8 protrudes more than the end portion of the ground conductor GND by a distance T. This distance T can be, for example, 1 to 5 mm (on the order of 3 mm under average conditions). With this structure, magnetic flux is more easily gathered.

In the communication terminal device 201, a strong magnetic field is generated at the longitudinal-direction end portion E (top end portion) of the casing 200 and there is excellent directivity over a wide angular range from an A direction to a B direction in FIG. 4C. Consequently, when wireless communication is performed with a communication partner by pointing the longitudinal-direction end portion (top end portion) E of the casing 200 at the communication partner, communication can be performed with the communication partner over a wide angular range.

Figure 6A:
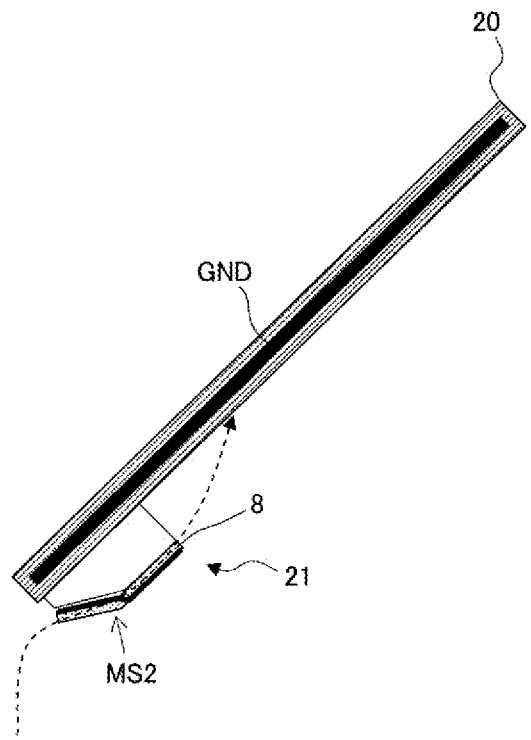
FIGS. 6A and 6B schematically illustrate the state of magnetic flux passing through an antenna coil when the angle θ illustrated in FIG. 4C is equal to 45°.
Figure 6B:
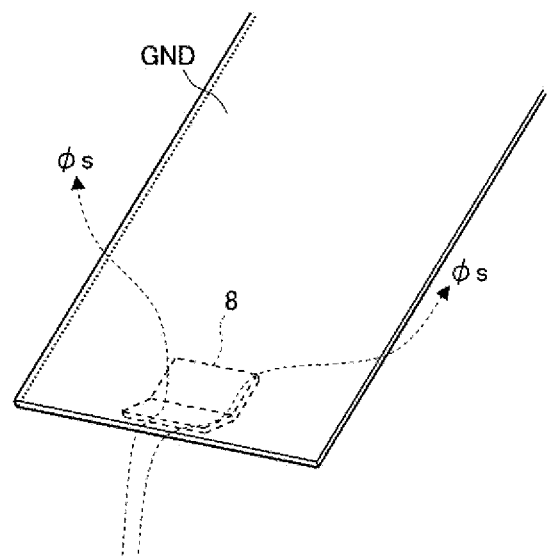
Figure 7:
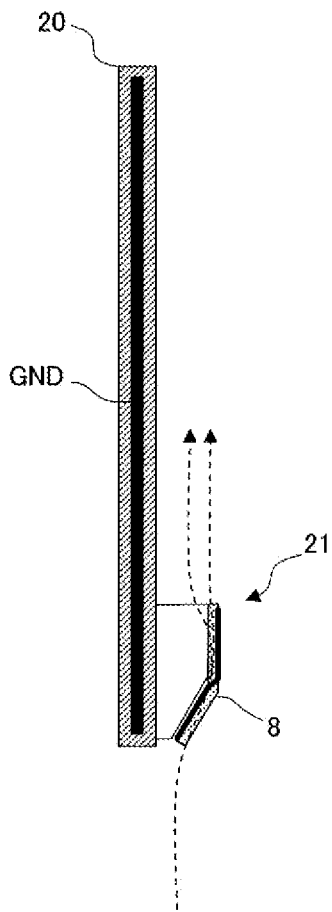
FIG. 7 schematically illustrates the state of magnetic flux passing through an antenna coil when the angle θ illustrated in FIG. 4C is equal to 90°.

FIGS. 5 to 7 schematically illustrate the state of magnetic flux passing through the antenna coil when the angle θ illustrated in FIG. 4C is changed. In FIGS. 5 to 7, magnetic flux is illustrated using broken lines.

Figure 5A:
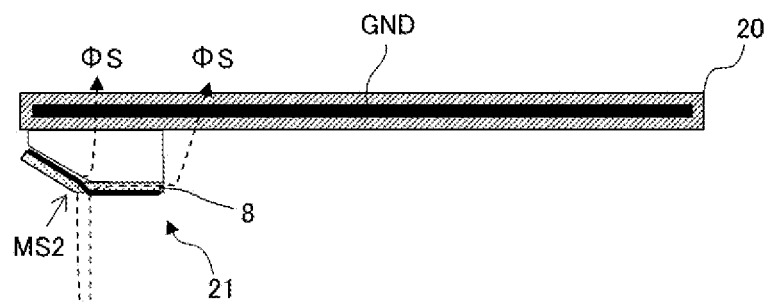
FIGS. 5A and 5B schematically illustrate the state of magnetic flux passing through an antenna coil when an angle θ illustrated in FIG. 4C is equal to 0°.
Figure 5B:
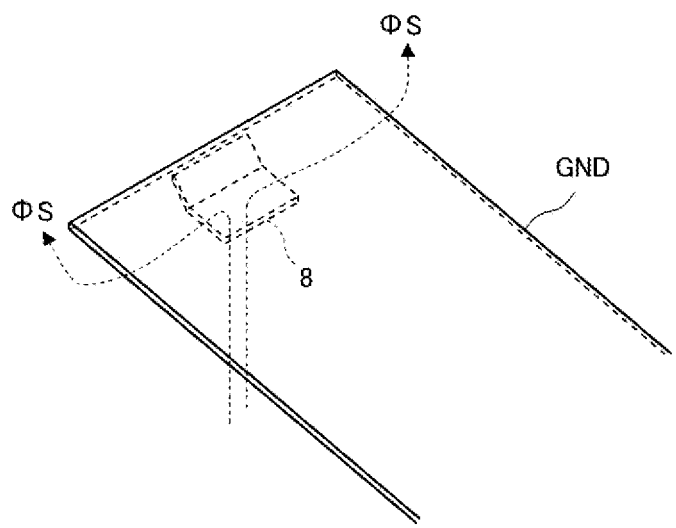

FIG. 5A illustrates the state of magnetic flux passing through the antenna coil when θ=0° and FIG. 5B is a perspective view of the same. When θ=0°, magnetic flux φs is generated that passes through the magnetic core 8 by entering the magnetic core 8 from the second main surface MS2 of the magnetic core 8 and then going toward the ground conductor GND side. Thus, when θ=0°, the magnetic flux passes through the winding center portion of the coil conductor.

FIG. 6A illustrates the state of magnetic flux passing through the antenna coil when θ=45° and FIG. 6B is a perspective view of the same. Also, when θ=45°, magnetic flux φs is generated that passes through the magnetic core 8 by entering the magnetic core 8 from the second main surface MS2 of the magnetic core 8 and then going toward the ground conductor GND side. Thus, also when θ=45°, the magnetic flux passes through the winding center portion of the coil conductor.

FIG. 7 illustrates the state of magnetic flux passing through the antenna coil when θ=90°. When θ=90°, the magnetic flux passes through the magnetic core 8 from an outer side end portion (bottom end portion in figure) of the magnetic core 8 toward an inner side end portion (upward). Thus, also when θ=90°, the magnetic flux passes through the winding center portion of the coil conductor.

Figure 8:
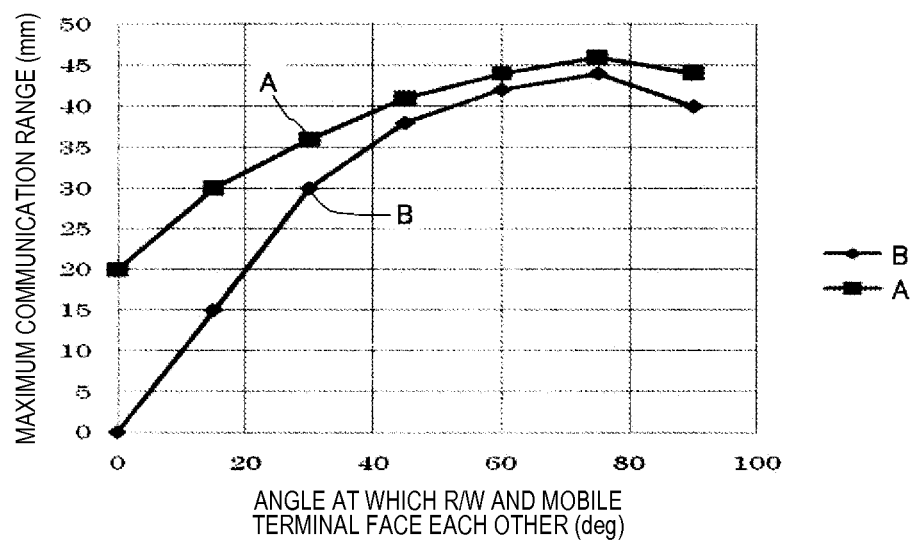
FIG. 8 illustrates the relationship between the angle θ at which a communication terminal device is held with respect to an antenna of a communication partner (reader/writer antenna), and the maximum communication range.

FIG. 8 illustrates the relationship between the angle θ at which the communication terminal device is held with respect to an antenna of a communication partner (reader/writer (R/W) antenna), and the maximum communication range.

Here, a characteristics line A illustrates the characteristics of the antenna device 101 according to the first embodiment and a characteristics line B illustrates the characteristics of an antenna device in which the support is not provided and in which the antenna coil is arranged parallel to the ground conductor with a gap G1 therebetween.

With the antenna for which a support is not provided and for which the entirety of the antenna coil is arranged parallel to the ground conductor, the maximum communication range is 0 mm (communication is impossible) when the angle θ at which the mobile terminal is held relative to the reader/writer is in the vicinity of 0°. In contrast, with the antenna according to the first embodiment, communication can be performed at a maximum communication range of 20 mm even when the angle θ at which the mobile terminal is held with respect to the reader/writer is 0°. Thus, a large maximum communication range can be secured over a wide angular range.

Figure 9A:
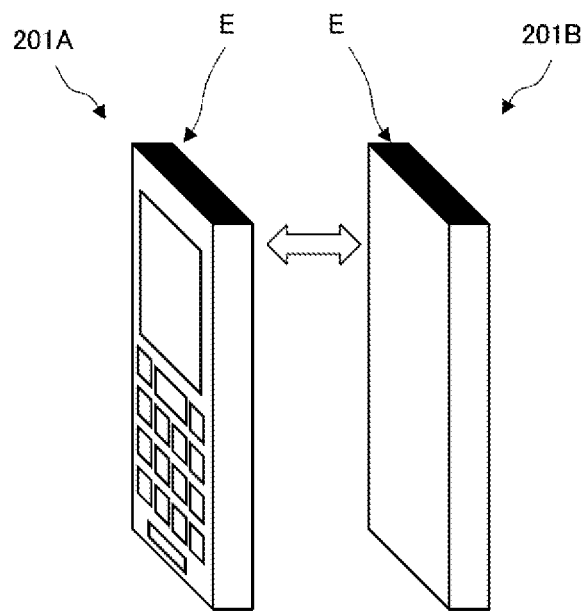
FIGS. 9A and 9B illustrate a state in which communication is performed between two communication terminal devices, where
Figure 9B:
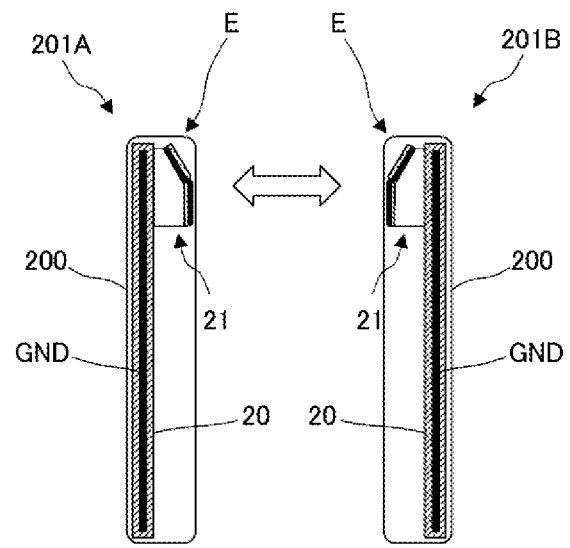

FIG. 9 illustrates a state in which communication is performed between two communication terminal devices, where FIG. 9A is a perspective view of a state in which communication is performed between two communication terminal devices and FIG. 9B is a sectional view of the same. Communication is performed in a state in which top end portions E of a first communication terminal device 201A and a second communication terminal device 201B have been brought close to each other. In this example, assuming that there is a relationship of mirror symmetry between the two communication terminal devices 201A and 201B, the angle of the casings with respect to the plane of the mirror is substantially 0°. In addition, each antenna coil 21 is positioned closer to the antenna of the communication partner than the ground conductor GND.

As illustrated in FIG. 5, the coil conductor of the antenna coil 21 is interlinked with the magnetic flux in a 0° direction and therefore wireless communication can be performed between the two communication terminal devices even when the back surfaces of the two communication terminal devices face each other as in FIG. 9.

Figure 10A:
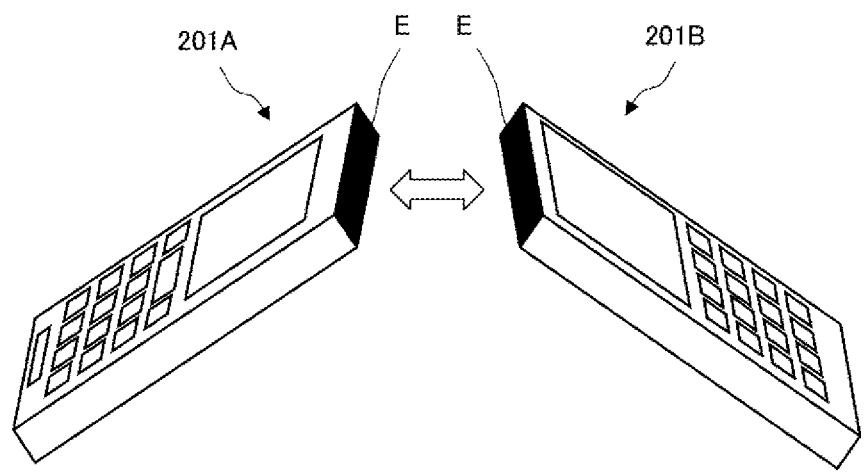
FIGS. 10A and 10B illustrate another state in which communication is performed between two communication terminal devices, where
Figure 10B:
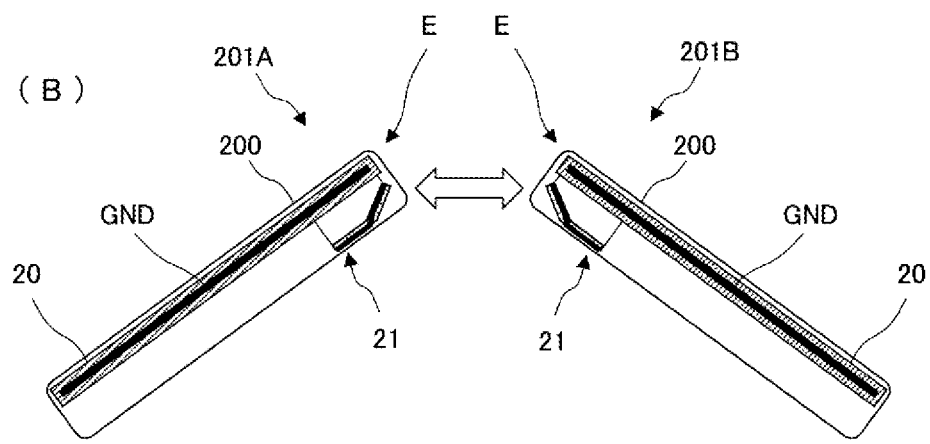

FIG. 10 illustrates another state in which communication is performed between two communication terminal devices. FIG. 10A is a perspective view illustrating a state in which communication is performed between two communication terminal devices and FIG. 10B is a sectional view of the same. Communication is performed in a state in which top end portions E of a first communication terminal device 201A and a second communication terminal device 201B have been brought close to each other. In this example, assuming that there is a relationship of mirror symmetry between the two communication terminal devices 201A and 201B, the angle of the casings with respect to the plane of the mirror is substantially 45°.

As illustrated in FIG. 6, the coil conductor of the antenna coil 21 is interlinked with the magnetic flux in a 45° direction and therefore wireless communication can be performed between the two communication terminal devices even when the back surfaces of the communication terminal devices are inclined and the top end portions of the casings are brought close to each other as in FIG. 10.

Figure 11A:
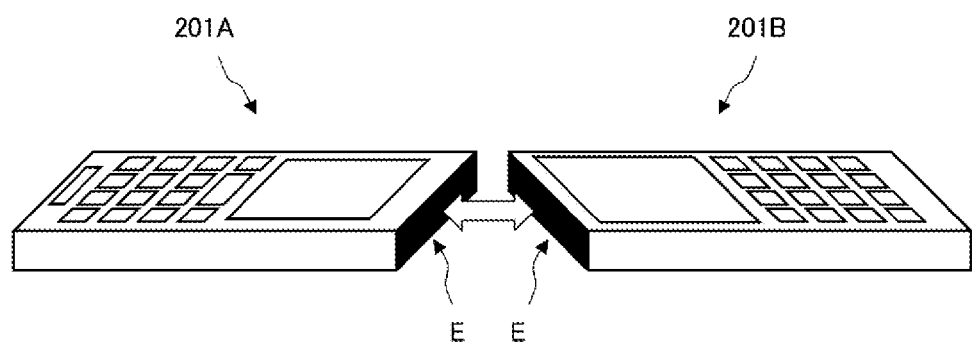
FIG. 11A is a perspective view of a state in which communication is performed between two communication terminal devices and FIG. 11B is a sectional view of the same.
Figure 11B:
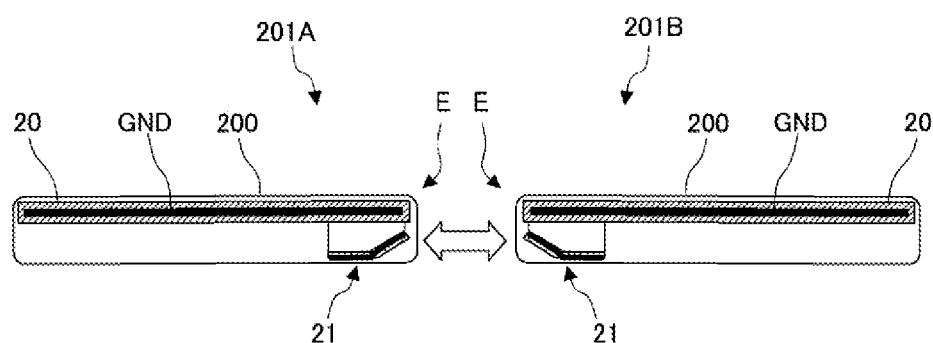

FIG. 11 illustrates yet another state in which communication is performed between two communication terminal devices. FIG. 11A is a perspective view illustrating a state in which communication is performed between two communication terminal devices and FIG. 11B is a sectional view of the same. Communication is performed in a state in which top end portions E of a first communication terminal device 201A and a second communication terminal device 201B have been brought close to each other. In this example, assuming that there is a relationship of mirror symmetry between the two communication terminal devices 201A and 201B, the angle of the casings with respect to the plane of the mirror is substantially 90°. Here, in FIG. 11A, the top end portions E of the two communication terminal devices 201A and 201B are depicted as facing each other at a certain angle, but this is for the sake of drawing the figure, and the top end portions E actually face each other in a parallel state.

As illustrated in FIG. 7, the coil conductor of the antenna coil 21 is interlinked with the magnetic flux in a 90° direction and therefore wireless communication can be performed between the two communication terminal devices even when the end surfaces of the top end portions of the communication terminal devices face each other as in FIG. 11.

Thus, communication can be performed over a wide range of angles at which the communication terminal device is held relative to the antenna device of the communication partner.

FIG. 12 illustrates the structure of an antenna coil according to a second exemplary embodiment.

Figure 12A:
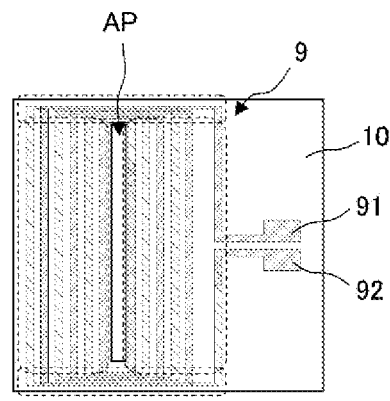
FIGS. 12A-12D illustrates the structure of an antenna coil according to a second exemplary embodiment.

FIG. 12A is a plan view of the flexible substrate 10 in a state where the coil conductor 9 has been formed thereon. The coil conductor 9 is formed on an upper surface of the flexible substrate 10.

Figure 12B:
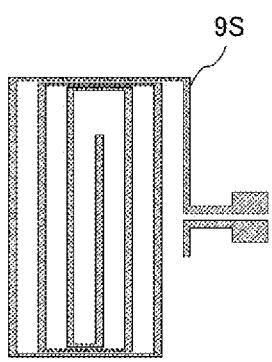
Figure 12C:
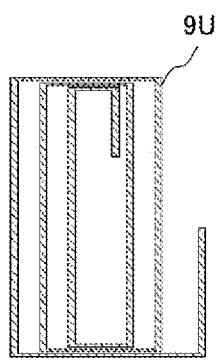
Figure 12D:
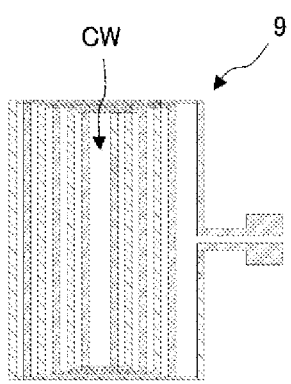

FIG. 12B illustrates the shape of an upper layer coil conductor portion 9S of the coil conductor 9. FIG. 12C illustrates shape of a lower layer coil conductor portion 9U of the coil conductor 9. FIG. 12D illustrates a state in which the lower layer coil conductor portion 9U and the upper layer coil conductor portion 9S are stacked one on top of the other.

The lower layer coil conductor portion 9U and the upper layer coil conductor portion 9S both have a substantially rectangular coil shape and an insulating layer is interposed between the lower layer coil conductor portion 9U and the upper layer coil conductor portion 9S. However, an inner side end portion of the lower layer coil conductor portion 9U and an inner side end portion of the upper layer coil conductor portion 9S are in conductive contact with each other and are connected in series with each other. In this way, the coil conductor 9 is formed in a coil shape around a coil conductor aperture CW.

The terminal electrode 91, which is continuous with an outer side end portion of the upper layer coil conductor portion 9S, is provided on the flexible substrate 10. Furthermore, the terminal electrode 92, which is in conductive contact with an outer side end portion of the lower layer coil conductor portion 9U, is provided on the flexible substrate 10.

The lower layer coil conductor portion 9U and the upper layer coil conductor portion 9S may be formed on both surfaces of the flexible substrate 10 instead of being formed in a superposed manner on one surface of the flexible substrate 10.

As illustrated in FIG. 12A, the aperture AP is formed at a position that corresponds to the coil conductor aperture CW in the flexible substrate 10.

Figure 13:
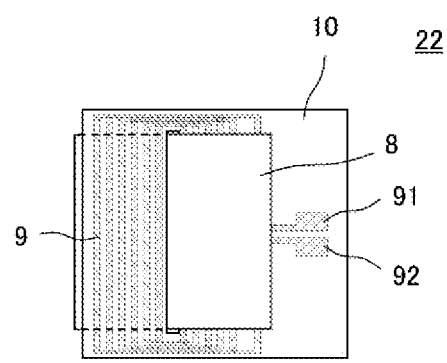
FIG. 13 is a plan view of an antenna coil.

FIG. 13 is a plan view of an antenna coil 22.

The magnetic core 8 is inserted into the aperture AP of the flexible substrate 10.

Thus, the antenna coil 22 is formed. The antenna device is formed by arranging the antenna coil 22 close to the circuit board 20 or directly mounting the antenna coil 22 on the circuit board 20. The antenna coil 22 is arranged so that the surface on which the terminal electrodes 91 and 92 illustrated in FIG. 12A are formed faces the circuit board 20 and the terminal electrodes 91 and 92 are connected to electrodes on the circuit board 20.

The lower layer coil conductor portion 9U and the upper layer coil conductor portion 9S of the coil conductor 9 are arranged so that main portions of the lower layer coil conductor portion 9U and the upper layer coil conductor portion 9S are not superposed with each other when viewed in plan. Consequently, stray capacitances between individual conductors of the coil conductor 9 are reduced and an antenna coil having desired characteristics can be formed.

In a third exemplary embodiment, an example of the arrangement and electrical connection of an antenna coil inside the casing of a communication terminal device will be described.

Figure 14A:
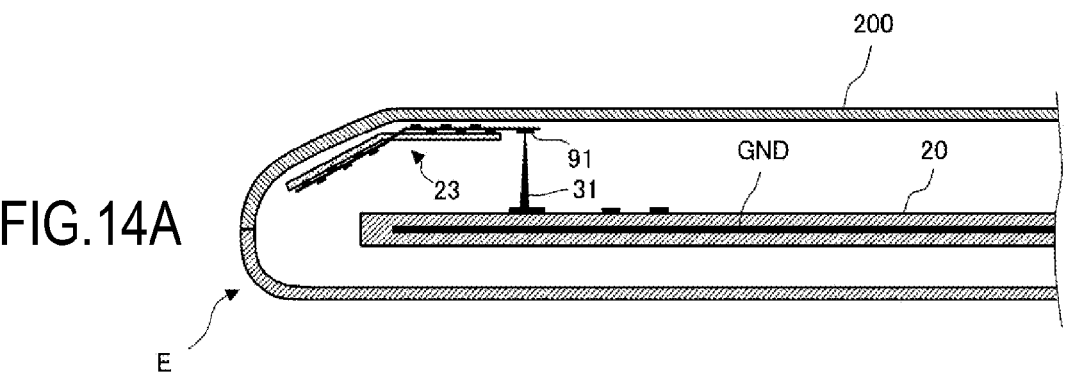
FIG. 14A is a sectional view of a main portion of a communication terminal device according to a third exemplary embodiment and FIG. 14B is a front view of an antenna coil of the communication terminal device.
Figure 14B:
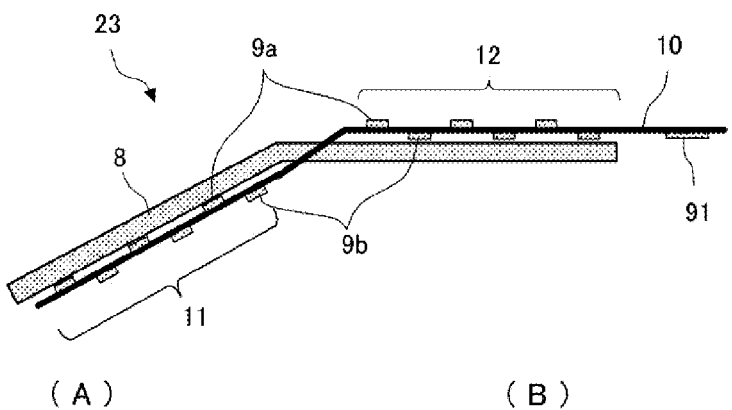

FIG. 14A is a sectional view of a main portion of a communication terminal device and FIG. 14B is a front view of an antenna coil of the communication terminal device. A coil conductor 9a is formed on the upper surface of the flexible substrate 10 and a coil conductor 9b is formed on the lower surface of the flexible substrate 10. The patterns of these coil conductors are similar to those of the second embodiment illustrated in FIG. 12. In the example illustrated in FIG. 12, a two-layer coil conductor is formed on one surface of the flexible substrate, whereas in the example illustrated in FIG. 14, the two layers of the coil conductor are formed on the two surfaces of the flexible substrate and are connected to each other with a via electrode at a certain place.

As illustrated in FIG. 14A, an antenna coil 23 is affixed to an inner surface of the casing 200 of the communication terminal device. In addition, the antenna coil 23 is arranged so that the first conductor portion 11, which is positioned in the vicinity of the longitudinal-direction end portion of the casing 200 is on the circuit board 20 side.

The casing 200 is formed of upper and lower casings that can be separated along a surface parallel to a plane of the circuit board 20. In a state in which an upper-side casing in which the antenna coil 23 is attached is covered by a lower-side casing, a contact pin 31, which stands erect from the circuit board 20, is in contact with the terminal electrode 91 of the coil conductor. As a result of this, the feeder circuit provided on the circuit board 20 and the antenna coil 23 are electrically connected to each other. With this configuration, there is no need for a special support. Consequently, the space between the antenna coil 23 and the circuit board 20 can also be utilized.

Figure 15A:
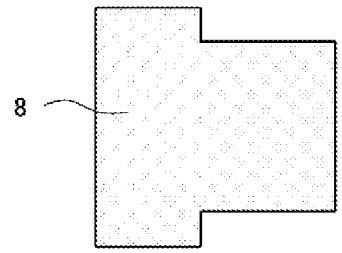
FIG. 15A is a plan view of a magnetic core provided in an antenna coil according to a fourth exemplary embodiment and FIG. 15B is a plan view of an antenna coil according to the fourth embodiment.
Figure 15B:
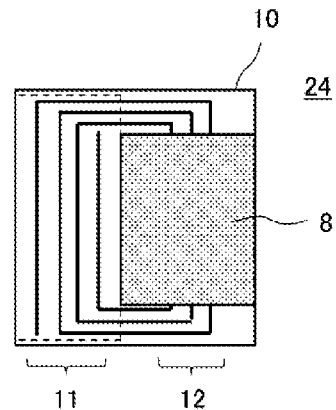

FIG. 15A is a plan view of a magnetic core 8 provided in an antenna coil according to a fourth exemplary embodiment and FIG. 15B is a plan view of an antenna coil 24 according to the fourth exemplary embodiment.

The difference between the antenna coil 24 of the fourth embodiment and the antenna coil 21 of the first embodiment illustrated in FIG. 3 is that one end of the magnetic core 8 is formed so as to be wider than another portion of the magnetic core 8 (formed with a large width).

As a result of using the thus-shaped magnetic core 8, for example, communication performance is improved in that, for example, the magnetic flux passing through the magnetic core 8 becomes stronger, the magnetic field coupling with the antenna of the communication partner can be strengthened and the maximum communication range is increased. Here, in FIG. 15B, the antenna coil 24 is formed such that the wide portion of the magnetic core 8 is close to the first conductor portion 11, but the antenna coil may instead be formed so that the wide portion of the magnetic core 8 is close to the second conductor portion 12. The wide portion of the magnetic core 8 (widened portion) is not limited to being a portion that is close to the first conductor portion 11 or a portion that is close to the second conductor portion 12. Thus, by making one end of the magnetic core 8 be wider than another portion of the magnetic core 8, the effect of concentrating magnetic flux is increased and communication performance is further improved. In addition, by making an end portion of the magnetic core that is on the side of an end portion of the ground conductor wider, the magnetic resistance in the vicinity of the end portion of the ground conductor is reduced and the effect of concentrating magnetic flux is increased.

In the antenna coil 24 illustrated in FIG. 15, the entirety of the one end portion of the magnetic core 8 is formed so as to be broader (wider), and this portion may have the shape of a trapezoid that is wider on the outer side thereof. In addition, the magnetic core 8 may instead have a butterfly shape in which the width increases toward both end portions from the center of the magnetic core 8.

FIG. 16A is a plan view of a magnetic core 8 provided in an antenna coil according to a fifth exemplary embodiment and FIG. 16B is a plan view of an antenna coil 25 according to the fifth exemplary embodiment. The antenna coil 25 includes the flexible substrate 10 on which a coil conductor is formed and a rectangular plate shaped magnetic core 8. The structure of the magnetic core 8 is different from that of the antenna coil 24 illustrated in FIG. 15B.

The magnetic core 8 illustrated in FIG. 16A is formed as follows. Both surfaces of a plate-shaped ferrite body in which break lines have been made in a grid pattern in advance are laminated with films. This body is then broken along the break lines into small pieces. The portions marked off by the broken lines in FIG. 16B indicate small pieces of a sintered magnetic body. With this structure, the entirety of a magnetic sheet 1 possesses flexibility. Consequently, an antenna coil that includes the magnetic sheet 1 can be easily arranged along the surface of a support. In addition, for example, the antenna coil can be provided along an inner surface of the casing of a mobile terminal. Therefore, the antenna coil can be easily incorporated into casings having a variety of shapes.

In FIG. 16B, the antenna coil 22 is structured so that the wide portion of the magnetic core 8 is close to the first conductor portion 11, but as described in the fourth embodiment, the wide portion of the magnetic core 8 (widened portion) is not limited to being a portion that is close to the first conductor portion 11 or a portion that is close to the second conductor portion 12. Thus, by making one end of the magnetic core 8 be wider than another portion of the magnetic core 8, the effect of concentrating magnetic flux is increased and communication performance is further improved.

In a sixth exemplary embodiment, an example will be described that is applied to a clamshell-type communication terminal device.

FIG. 17A is a perspective view of a communication terminal device 206 and FIG. 17B is a sectional view of the same. The casing of the communication terminal device 206 is formed of a top-side casing 200A and a bottom-side casing 200B. In this case, the antenna coil 21 is arranged in the vicinity of a top end portion E of the top-side casing 200A. A liquid crystal display panel 41 is accommodated in the top-side casing 200A. A shield plate 41S is affixed to the back surface of the liquid crystal display panel 41 and therefore the shield plate 41S corresponds to a planar conductor according to the present disclosure. A key input unit 42 and the circuit board 20 are provided in the bottom-side casing 200B.

With this structure, when the top-side casing 200A and the bottom-side casing 200B are folded together, the antenna coil 21 is not interposed between the ground conductor GND of the bottom-side casing 200B and the shield plate of the top-side casing 200A and therefore wireless communication can be performed using the antenna coil 21 even when the communication terminal device is in a folded state.

In a seventh exemplary embodiment, an example will be described that is applied to a slide-type communication terminal device.

Figure 18A:
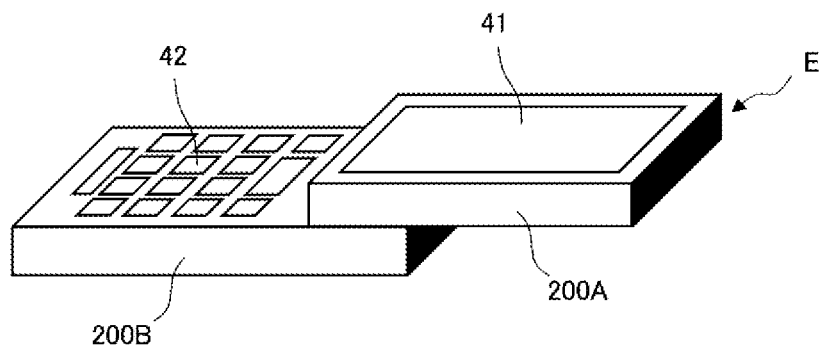
FIG. 18A is a perspective view of a communication terminal device according a seventh exemplary embodiment and FIG. 18B is a sectional view of the same.
Figure 18B:
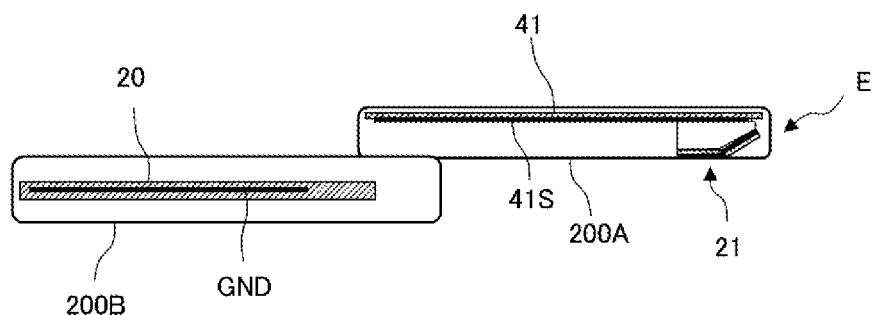

FIG. 18A is a perspective view of a communication terminal device 207 and FIG. 18B is a sectional view of the same. The casing of the communication terminal device 207 is formed of a top-side casing 200A and a bottom-side casing 200B. In this case, the antenna coil 21 is arranged in the vicinity of a top end portion E of the top-side casing 200A. The liquid crystal display panel 41 is accommodated in the top-side casing 200A. The shield plate 41S is affixed to the back surface of the liquid crystal display panel 41 and therefore the shield plate 41S corresponds to a planar conductor according to the present disclosure. A key input unit 42 and the circuit board 20 are included in the bottom-side casing 200B.

The ground conductor of the circuit board 20 inside the bottom-side casing 200B is patterned so that a portion of the circuit board 20 that is superposed with the antenna coil 21, when the top-side casing 200A is housed, is a non-ground region. With this structure, even when the top-side casing 200A is housed, wireless communication can be performed by utilizing the antenna coil.

In the above-described embodiments, a shield plate arranged on the back surface of a ground electrode of a circuit board or a liquid crystal display panel was described as an example of a planar conductor, but the antenna device can be instead formed with a conductor film, a conductor foil or a battery pack formed on an inner surface of the casing serving as a planar conductor. In addition, the planar conductor is not limited to rectangular conductors and may be a conductor of any of various planar shapes. In addition, the planar conductor is not limited to being formed of a single layer and may instead be formed of a plurality of layers. Furthermore, it is sufficient that a main portion of the planar conductor be planar, and there may be a bent portion in the remaining portion of the planar conductor.

In addition, this can be similarly applied in the case where the casing of a communication terminal device is a swivel-type casing.

In addition, in the embodiments, examples were described in which a circuit board is employed in which a ground conductor is formed in an inner layer thereof, but the present disclosure can also be similarly applied to embodiments in which a ground conductor is formed on a surface of a circuit board.

In an embodiment an antenna device and a communication terminal device consistent with the present disclosure, in particular, a coil conductor that forms part of an antenna coil includes a first conductor portion that is positioned on a first main surface side of a magnetic core and a second conductor portion that is positioned on a second main surface side of the magnetic core and arranged at a different position to the first conductor portion when viewed in plan from a direction of the main surfaces. In addition, the antenna coil is arranged so that the first main surface side of the magnetic core is on a planar conductor side and the first conductor portion of the coil conductor is positioned on an end portion side of the planar conductor (that is, in the vicinity of a top end portion of the casing) and the first portion of the coil conductor is bent in a direction toward the planar conductor. Therefore, when wireless communication is performed with a communication partner by pointing the top end portion of the casing at the communication partner, communication can be performed with the communication partner over a wide angular range largely independent of the positional relationship (in particular, angular relationship) between the antenna device or communication terminal device and the communication partner.

That which is claimed is:

1. An antenna device comprising:
   an antenna coil including a magnetic core having a first main surface and a second main surface and a coil conductor wound around the magnetic core, and
   a planar conductor arranged close to the magnetic core,
   wherein the coil conductor includes a first conductor portion positioned on a first main surface side of the magnetic core and a second conductor portion positioned on a second main surface side of the magnetic core and arranged at a different position to the first conductor portion when viewed in plan from a direction of the first or second main surface, and
   wherein the antenna coil is arranged so that the first main surface side of the magnetic core is on the planar conductor side and so that the first conductor portion of the coil conductor is closer to an end portion of the planar conductor than the second conductor portion, and the first conductor portion of the coil conductor is bent in a direction toward the planar conductor such that a plane including the first conductor portion is non-parallel to the planar conductor.

2. The antenna device according to claim 1, wherein the width of one end of the magnetic core is larger than the width of the remaining portion of the magnetic core.

3. The antenna device according to claim 1, wherein the magnetic core is a mixture of a magnetic powder and a resin molded into a sheet shape, or is a sintered magnetic body that is made into a plurality of small pieces.

4. The antenna device according to claim 1, wherein the planar conductor is a ground electrode that is formed in a circuit board arranged inside a casing and the second conductor portion of the coil conductor is arranged so as to face the planar conductor.

5. The antenna device according to claim 4, wherein the width of one end of the magnetic core is larger than the width of the remaining portion of the magnetic core.

6. The antenna device according to claim 4, wherein the magnetic core is a mixture of a magnetic powder and a resin molded into a sheet shape, or is a sintered magnetic body that is made into a plurality of small pieces.

7. The antenna device according to claim 6, wherein the width of one end of the magnetic core is larger than the width of the remaining portion of the magnetic core.

8. The antenna device according to claim 1, wherein an end portion of the magnetic core, in said plan view, protrudes a predetermined distance from the end portion of the planar conductor.

9. The antenna device according to claim 1, further comprising an insulating support between the antenna coil and the planar conductor.

10. A communication terminal device comprising:
    an antenna coil including a magnetic core having a first main surface and a second main surface and a coil conductor wound around the magnetic core,
    a planar conductor arranged close to the magnetic core, and
    a casing that houses the antenna coil and the planar conductor,
    wherein the coil conductor includes a first conductor portion positioned on a first main surface side of the magnetic core and a second conductor portion positioned on a second main surface side of the magnetic core and arranged at a different position to the first conductor portion when viewed in plan from a direction of the first or second main surface, and
    wherein the antenna coil is arranged so that the first main surface side of the magnetic core is on the planar conductor side and so that the first conductor portion of the coil conductor is closer to an end portion of the planar conductor than the second conductor portion, and the first conductor portion of the coil conductor is bent in a direction toward the planar conductor such that a plane including the first conductor portion is non-parallel to the planar conductor.

11. The communication terminal device according to claim 10, wherein the width of one end of the magnetic core is larger than the width of the remaining portion of the magnetic core.

12. The communication terminal device according to claim 10, wherein the magnetic core is a mixture of a magnetic powder and a resin molded into a sheet shape, or is a sintered magnetic body that is made into a plurality of small pieces.

13. The communication terminal device according to claim 10, wherein the planar conductor is a ground electrode that is formed in a circuit board arranged inside a casing and the second conductor portion of the coil conductor is arranged so as to face the planar conductor.

14. The communication terminal device according to claim 13, wherein the width of one end of the magnetic core is larger than the width of the remaining portion of the magnetic core.

15. The communication terminal device according to claim 13, wherein the magnetic core is a mixture of a magnetic powder and a resin molded into a sheet shape, or is a sintered magnetic body that is made into a plurality of small pieces.

16. The communication terminal device according to claim 15, wherein the width of one end of the magnetic core is larger than the width of the remaining portion of the magnetic core.

17. The communication terminal device according to claim 10, wherein an end portion of the magnetic core, in said plan view, protrudes a predetermined distance from the end portion of the planar conductor.

18. The communication terminal device according to claim 10, further comprising an insulating support between the antenna coil and the planar conductor.

* * * * *